(12) United States Patent  
Jose et al.

(10) Patent No.: US 10,582,147 B2  
(45) Date of Patent: Mar. 3, 2020

(54) SYSTEMS AND METHODS FOR INTELLIGENTLY RECORDING VIDEO DATA STREAMS

(71) Applicant: Honeywell International Inc., Morristown, NJ (US)

(72) Inventors: Vinu Jose, Bangalore (IN); Nidhin Vishnu, Bangalore (IN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 15/856,839

(22) Filed: Dec. 28, 2017

(65) Prior Publication Data

US 2019/0208160 A1    Jul. 4, 2019

(51) Int. Cl.
| | |
|---|---|
| *H04N 5/77* | (2006.01) |
| *H04N 7/015* | (2006.01) |
| *G08B 13/196* | (2006.01) |
| *H04N 5/14* | (2006.01) |
| *H04N 5/262* | (2006.01) |
| *H04N 5/92* | (2006.01) |
| *H04N 7/01* | (2006.01) |

(52) U.S. Cl.
CPC ......... *H04N 5/77* (2013.01); *G08B 13/19667* (2013.01); *H04N 5/144* (2013.01); *H04N 5/2628* (2013.01); *H04N 5/9205* (2013.01); *H04N 7/015* (2013.01); *H04N 7/0117* (2013.01); *H04N 7/0125* (2013.01)

(58) Field of Classification Search
CPC ....... H04N 5/144; H04N 7/0125; H04N 7/015
See application file for complete search history.

(56) References Cited

U.S. PATENT DOCUMENTS

| 6,393,152 B2 | 5/2002 | Takahashi et al. |
| 8,564,661 B2 | 10/2013 | Lipton et al. |

(Continued)

FOREIGN PATENT DOCUMENTS

| CN | 106485182 A | 3/2017 |
| EP | 1 953 699 A1 | 8/2008 |

OTHER PUBLICATIONS

Hata et al., Mitsubishi Electric Research Laboratories, Surveillance System with Mega-Pixel Scalable Transcoder, Jan. 2007.

(Continued)

*Primary Examiner* — Thai Q Tran  
*Assistant Examiner* — Jose M Mesa  
(74) *Attorney, Agent, or Firm* — Husch Blackwell LLP

(57) ABSTRACT

Systems and methods for intelligently recording video data streams are provided. Some methods can include determining whether an area of interest in a first high resolution video data stream of a field of view of a camera includes motion. When the area of interest includes the motion, the area of interest can be cropped from the first high resolution video data stream to form a second high resolution video data stream of the area of interest, and the first high resolution video data stream of an area of non-interest in the field of view can be converted into a first low resolution video data stream of the area of non-interest. When the area of interest fails to include the motion, the first high resolution video data stream of the field of view can be converted into a second low resolution video data stream of the field of view.

15 Claims, 1 Drawing Sheet

(56) References Cited

U.S. PATENT DOCUMENTS

| | | | |
|---|---|---|---|
| 9,082,018 B1* | 7/2015 | Laska | G06K 9/00711 |
| 9,215,467 B2 | 12/2015 | Cheok et al. | |
| 9,325,951 B2 | 4/2016 | Saptharishi | |
| 9,769,368 B1* | 9/2017 | Morford | H04N 5/23206 |
| 2015/0047024 A1 | 2/2015 | Park | |
| 2015/0145944 A1* | 5/2015 | Stonefield | H04N 7/15 |
| | | | 348/14.02 |
| 2015/0215583 A1 | 7/2015 | Chang | |
| 2015/0364158 A1 | 12/2015 | Gupte et al. | |
| 2018/0349708 A1* | 12/2018 | van Hoof | G06K 9/00771 |

OTHER PUBLICATIONS

Unifore Security, Overview and Close-up: 20 Megapixel (5472 X 3648) IP Camera, Jul. 30, 2015.

English-language translation of CN patent publication 106485182, dated Mar. 8, 2017.

Extended European search report from corresponding EP patent application 18193545.3, dated Mar. 6, 2019.

\* cited by examiner

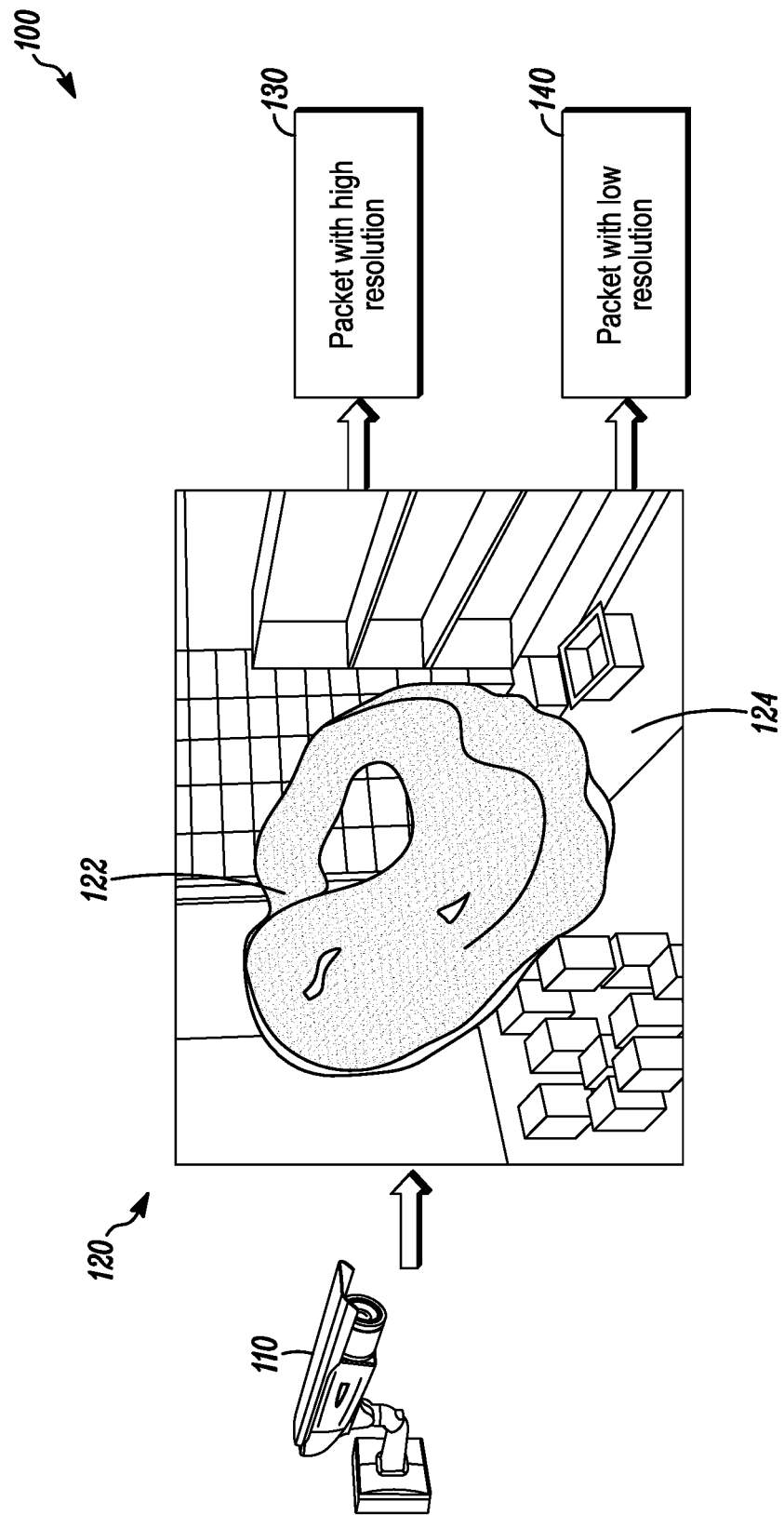

SYSTEMS AND METHODS FOR INTELLIGENTLY RECORDING VIDEO DATA STREAMS

FIELD

The present invention relates to video surveillance systems. More particularly, the present invention relates to systems and methods for intelligently recording video data streams in video surveillance systems.

BACKGROUND

Known video surveillance systems can include thousands of cameras, the majority of which are IP cameras, that can save video data streams to network video recorders. However, in known video surveillance systems, the hard disk capacity of the network video recorders is a problem. For example, a lot of the video data streams are saved with high resolution, but these saved video data streams often do not add any value to users.

In view of the above, there is a continuing, ongoing need for improved systems and methods.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for intelligently recording video data streams in video surveillance systems. Advantageously, systems and methods disclosed herein can intelligently record and save an unwanted video data stream or an area of non-interest in a video data stream with low resolution and record and save an area of interest in the video data stream with high resolution so as to optimize hard disk utilization. Furthermore, systems and methods disclosed herein can advantageously record and save multiple video data streams from a single camera independently and with different resolutions to optimize bandwidth usage.

In accordance with disclosed embodiments, systems and methods disclosed herein can receive user input identifying the area of interest in a field of view of the camera. For example, in some embodiments, the area of interest can include an area with a high probability of motion or activity therein, such as, for example, a door area, a window area, or a walkway area.

During operation, the camera can transmit a first high resolution video data stream of the field of view of the camera to a recording device, such as, for example, a network video recorder or a mobile or cloud based recorder, and systems and methods disclosed herein can analyze each frame of the first high resolution video data stream for motion or activity in the area of interest. When the motion or the activity is detected, systems and methods disclosed herein can crop the area of interest from the first high resolution video data stream on a frame by frame basis to form a second high resolution video data stream of only the area of interest and can convert a remainder of the first high resolution video data stream outside of the area of interest, that is, an area of non-interest, into a low resolution compressed video data stream on a frame by frame basis. In some embodiments, systems and methods disclosed herein can record both the second high resolution video data stream and the low resolution compressed video data stream as multiple and separate video data streams from the camera. Furthermore, when the motion or the activity is not detected, systems and methods disclosed herein can convert the entire first high resolution video data stream into the low resolution decompressed video data stream of the field of view of the camera on a frame by frame basis.

In some embodiments, systems and methods disclosed herein can calibrate the return on investment for converting some or all of the first high resolution video data stream of the field of view of the camera into the second high resolution video data stream of the area of interest or into the low resolution compressed video data stream of the field of view or of the area of non-interest. Responsive thereto, in some embodiments, systems and methods disclosed herein can transmit a notification message to a user suggesting conversion pursuant to such calibration. Additionally or alternatively, responsive thereto, in some embodiments, systems and methods disclosed herein can transmit operation instructions to the camera, for example, when the camera is a PTZ camera, to adjust a pan, tilt, or zoom operation of the camera and obtain a clearer image of the area of interest.

As explained above, in some embodiments, systems and methods disclosed herein can record and save multiple video data streams from a single camera independently and with different resolutions. In this regard, when recording or saving each of the video data streams, systems and methods disclosed herein can associate a QR code with each frame of each of the video data streams from the camera or on the recording device, and the QR code can be specific to the camera or specific to the recording device. Additionally or alternatively, in some embodiments, systems and methods disclosed herein can also associate the QR code with an alarm detected in the video data streams.

The QR code can include data, such as, for example, a MAC ID of the camera, a random key, and a MAC ID of the recording device. In some embodiments, the QR code can be embedded in each frame or each I-frame of each of the video data streams. Additionally or alternatively, in some embodiments, the QR code can be part of an index file and function as an external file reference. Accordingly, in some embodiments, systems and methods disclosed herein can search the recording device based on the QR code or can decode the QR code when retrieving the video data streams from memory of the recording device.

FIG. 1 is a block diagram of a system 100 in accordance with disclosed embodiments. As seen in FIG. 1, the camera 110 can generate a first high resolution image 120 of the field of view of the camera 110, and systems and methods disclosed herein can analyze the first high resolution image 120 for motion or activity in the area of interest 122 within the field of view. When the motion or the activity is detected, systems and methods disclosed herein can crop the area of interest 122 from the first high resolution image 120 to form a second high resolution image 130 of the area of interest 122 and can convert the area of non-interest 124 that is outside of the area of interest 122 in the first high resolution image 120 into the low resolution compressed image 140.

It is to be understood that each of the camera and the recording device disclosed herein can include a respective transceiver device, a respective memory device, and a respective user interface device each of which can be in communication with respective control circuitry, a respective programmable processor, and respective executable control software as would be understood by one of ordinary skill in the art. The respective executable control software can be stored on a transitory or non-transitory computer readable medium, including, but not limited to local computer memory, RAM, optical storage media, magnetic storage media, flash memory, and the like. In some embodiments, the respective control circuitry, the respective programmable processor, and the respective executable control software can execute and control some or all of the methods disclosed herein.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising: receiving a first high resolution video data stream of a field of view of a camera; analyzing the first high resolution video data stream to determine whether an area of interest in the field of view includes motion or activity; when the area of interest includes the motion or the activity, processing the first high resolution video data stream by digitally cropping the first high resolution video data stream to include only the area of interest to form a second high resolution video data stream of the area of interest and digitally compressing a remainder of the first high resolution video data stream that fails to include the area of interest into a low resolution video data stream of an area of non-interest, wherein an initial resolution of the area of interest within the first high resolution video data stream is equal to a resulting resolution of the area of interest within the second high resolution video data stream; recording the second high resolution video data stream on a recording device and, simultaneously therewith, associating a QR code with each frame of the second high resolution video data stream; and recording the low resolution video data stream on the recording device and, simultaneously therewith, associating the QR code with each frame of the low resolution video data stream.

2. The method of claim 1 further comprising: the recording device digitally cropping the area of interest from the first high resolution video data stream to form the second high resolution video data stream; and the recording device digitally compressing the remainder of the first high resolution video data stream into the low resolution video data stream.

3. The method of claim 1 further comprising:
the camera digitally cropping the area of interest from the first high resolution video data stream to form the second high resolution video data stream; and
the camera digitally compressing the remainder of the first high resolution video data stream into the low resolution video data stream.

4. The method of claim 1 further comprising receiving user input identifying the area of interest.

5. The method of claim 1 further comprising digitally cropping the area of interest from the first high resolution video data stream to form the second high resolution video data stream on a frame by frame basis.

6. The method of claim 1 further comprising digitally compressing the remainder of the first high resolution video data stream into the low resolution video data stream on a frame by frame basis.

7. A method comprising: receiving a first high resolution video data stream of a field of view of a camera; analyzing the first high resolution video data stream to determine whether an area of interest in the field of view includes motion or activity; when the area of interest includes the motion or the activity, processing the first high resolution video data stream by digitally cropping the first high resolution video data stream to include only the area of interest to form a second high resolution video data stream of the area of interest and digitally compressing a remainder of the first high resolution video data stream that fails to include the area of interest into a first low resolution video data stream of an area of non-interest; when the area of interest fails to include the motion or the activity, processing the first high resolution video data stream by digitally compressing all of the first high resolution video data stream into a second low resolution video data stream of the field of view, wherein an initial resolution of the area of interest within the first high resolution video data stream is equal to a resulting resolution of the area of interest within the second high resolution video data stream; recording the second high resolution video data stream on a recording device and, simultaneously therewith, associating a QR code with each frame of the second high resolution video data stream; and recording the first low resolution video data stream or the second low resolution video data stream on the recording device and, simultaneously therewith, associating the QR code with each frame of the first low resolution video data stream or the second low resolution video data stream.

8. The method of claim 7 further comprising recording the second low resolution video data stream on the recording device.

9. The method of claim 8 further comprising the recording device digitally compressing the first high resolution video data stream into the second low resolution video data stream.

10. The method of claim 7 further comprising the camera digitally compressing the first high resolution video data stream into the second low resolution video data stream.

11. The method of claim 7 further comprising receiving user input identifying the area of interest.

12. The method of claim 7 further comprising digitally compressing the first high resolution video data stream into the second low resolution video data stream on a frame by frame basis.

13. A system comprising: a transceiver; a programmable processor; and executable control software stored on a non-transitory computer readable medium, wherein the transceiver receives a first high resolution video data stream of a field of view of a camera, wherein the programmable processor and the executable control software analyze the first high resolution video data stream to determine whether an area of interest in the field of view includes motion or activity, wherein, when the area of interest includes the motion or the activity, the programmable processor and the executable control software process the first high resolution video data stream by digitally cropping the first high resolution video data stream to include only the area of interest to form a second high resolution video data stream of the area of interest and digitally compressing a remainder of the first high resolution video data stream that fails to include the area of interest into a first low resolution video data stream of an area of non-interest, wherein an initial resolution of the area of interest within the first high resolution video data stream is equal to a resulting resolution of the area of interest within the second high resolution video data stream, wherein, when the area of interest fails to include the motion or the activity, the programmable processor and the executable control software process the first high resolution video data stream by digitally compressing all of the first high resolution video data stream of the field of view into a second low resolution video data stream of the field of view, wherein the programmable processor and the executable control software record the second high resolution video data stream in a memory and, simultaneously therewith, associate a QR code with each frame of the second high resolution video data stream, and wherein the programmable processor and the executable control software record the first low resolution video data stream or the second low resolution video data stream in the memory and, simultaneously therewith, associate the QR code with each frame of the first low resolution video data stream or the second low resolution video data stream.

14. The method of claim 13 further comprising:
a user interface,
wherein the user interface receives user input identifying the area of interest.

15. The method of claim 13 wherein the programmable processor and the executable control software digitally crop the area of interest from the first high resolution video data stream to form the second high resolution video data stream, digitally compress the remainder of the first high resolution video data stream into the first low resolution video data stream, and digitally compress the first high resolution video data stream into the second low resolution video data stream on a frame by frame basis.

* * * * *